United States Patent Office

Re. 27,896
Reissued Jan. 22, 1974

27,896

METHOD OF FORMING A COPPER CONTAINING PROTECTIVE COATING PRIOR TO ELECTRODEPOSITION OF PAINT

Werner Rausch, Stierstadt, Hans Hansen, Karben, and Gerhard Mueller, Hanau, Germany, assignors to Hooker Chemical Corporation, Niagara Falls, N.Y.

No Drawing. Original No. 3,467,589, dated Sept. 16, 1969, Ser. No. 587,679, Oct. 19, 1966. Application for reissue Sept. 5, 1972, Ser. No. 286,505
Claims priority, application Germany, Nov. 6, 1965, P 12 87 413.4
Int. Cl. B01k *5/02;* C23b *13/00*
U.S. Cl. 204—181 8 Claims

Matter enclosed in heavy brackets [ ] appears in the original patent but forms no part of this reissue specification; matter printed in italics indicates the additions made by reissue.

This invention relates to an improved process for treating metal surfaces and, more particularly, relates to an improved method for phosphatizing ferrous metal surfaces as a pretreatment for the electrophoretic application of a paint or lacquer to the metal surface.

It has long been known to coat ferrous metal surfaces with a thin, crystalline, zinc phosphate coating, before applying a protective paint or lacquer coating to the metal surface. The provision of such a phosphate coating has been found greatly to improve both the adhesion of the paint or lacquer film to the metal surface and the corrosion resistance of the painted metal. Typical of the solutions which have been used to produce these zinc phosphate coatings are aqueous acidic zinc phosphate solutions which contain one or more accelerating agents. Exemplary of the accelerating agents which have been used are oxidizing agents, such as nitrates, chlorates, nitrites, peroxides, bromates, organic nitro compounds and the like. Additionally heavy metal accelerators, which are nobler than iron, such as nickel, copper and the like, have also been used.

With the recent development of various water-soluble, resin based paints and lacquers, a great deal of work has been done on the application of such coating systems by electrophoresis. The electrophoretic application of paint and lacquer involves the phenomena of electro-osmosis and electrolysis, as well as electrophoresis. In this method, an electric current is passed through the paint or lacquer solution while the article to be painted is made an electrode, usually the anode, in the paint or lacquer. When using such electrophoretic application techniques on phosphate coated ferrous metal surfaces, the resulting paint films have often been found to have numerous minute depressions or pin holes. Such lacquer films have, generally, provided only a slight corrosion protective action, probably because of the much smaller paint film thickness in the depressions. Moreover, in some instances, pin holes or pores have been found in the coating which extend to the phosphate layer substrate.

In an attempt to overcome this problem, paint and lacquers have been used with synthetic resin components to form films which during baking, and particularly during heating to the baking temperature, soften so that the surface blends smoothly. This technique, however, has not been completely satisfactory in that with such resin films, there has often been found to be a withdrawal of the paint film from the edge of the workpiece being treated so that these places are then subjected to additional corrosive attacks.

It is, therefore, an object of the present invention to provide an improved method for pre-treatment of ferrous metal surfaces prior to the electrophoretic application of a protective coating to the metal surface.

A further object of the present invention is to provide an improved process, including the pretreatment of the metal surface, for electrophoretically applying a protective coating to ferrous metal.

These and other objects will become apparent to those skilled in the art from the description of the invention which follows.

Pursuant to the above objects, the present invention includes a process for treating ferrous metal surfaces which comprises contacting the metal surface to be treated with an aqueous acidic zinc phosphate solution containing, in addition to zinc and phosphate ions, from 3 to 200 milligrams per liter of $Cu^{++}$, maintaining the surface in contact with said solution for a period sufficient to form a copper containing zinc phosphate coating on the surface and, thereafter, electrophoretically depositing a paint on the thus-coated surface. By this method, it is found that the surface depressions and pin holes in the paint or lacquer coating are substantially eliminated and there is obtained a coated metal surface which has excellent corrosion resistance.

More specifically, in the practice of the method of the present invention, the ferrous metal surfaces to be treated are contacted with an aqueous acidic zinc phosphate coating solution containing from about 3 to 200 and preferably from about 15 to 150 milligrams per liter of $Cu^{++}$. Various zinc phosphate solutions, containing the copper in the above indicated amounts, which are useful for forming protective coatings on ferrous surfaces, as are known in the art, may be used in the process of the present invention. Typically, the solutions are aqueous acidic solutions containing zinc ions and phosphate ions.

Additionally, these solutions may also contain accelerators, such as nitrates, nitrites, bromates, peroxide compounds and the like. Components to influence the layer structure and thickness may also be included in the composition, such as condensed phosphate, organic amines, alkaline earth metal salts, such as calcium salts, and the like. Activating components, such as simple and/or complex fluorides, such as F, $BF_4$, $SiF_6$, $ZnF_6$, and the like may also be added as well as other modifying ions such as ferrous ions, nickel ions and the like.

Exemplary of zinc phosphate solutions which may be used are those described in U.S. Patents 2,835,617; 3,090,709; 3,161,549; 2,813,812; 2,734,204; 3,015,594; 2,540,314; 2,514,149; 2,591,479; and 2,487,137. Although the specific concentration of the phosphate coating solutions used depends on the type of coating desired and the specific operating conditions utilized, in general it has been found to be desirable that the solutions used contain from about 0.5 to 4% by weight of phosphate ($PO_4$) and have a free phosphoric acid content within the range of about 0.3 to about 0.8%. Additionally, the accelerators and modifying ions are typically present in amounts within the range of about 0.001 to about 5% by weight of the solution, depending upon the particular ions added and the nature of the coating which is desired.

In formulating these treating solutions, zinc phosphate, zinc oxide, phosphoric acid, and other suitable sources of zinc ions and phosphate ions may be used. The various accelerating, activating, or other modifying agents may be added in any suitable water-soluble and/or dispersable form, so long as the anions or cations added with the modifying materials are not detrimental to either the coating solution or the coatings which are produced. The copper ions may be included in the coating solution using copper oxide, copper carbonate or the like, supplemented with acid, or by means of suitable copper salts, such as copper nitrate, copper sulfate or the like.

The zinc phosphate phosphatizing solution may be applied to the metal surface to be treated in any convenient manner, such as by spraying, submerging, dipping, spreading, brushing, and the like, with spraying techniques frequently being preferred. The temperature of the phosphatizing baths of the time of the application to the metal surfaces may be between room temperature and the boiling point of the solution, i.e., from about 20 degrees centigrade to 100° centigrade, with temperatures in the lower part of the range often being preferred. Similarly, the contact times between the coating solution and the surface to be treated will be those which are normally used in applying zinc phosphate coatings and will vary according to the nature of the coating desired and the solution operating conditions. Typical contact times are from several seconds, e.g., five seconds, up to 5 minutes or more depending upon the type of application techniques which are used.

In many instances, it has been found to be desirable to control the application of the phosphate coating, by selection of the coating solution and conditions used, so that the coating produced has a coating weight which is not substantially in excess of about 10 grams per square meter, with coating weights of from about 1 to 6 grams per square meter being preferred. In general, it has been found desirable that the coatings produced contain copper, deposited on the steel surfaces during the coating operation, in an amount within the range of about 0.03 to about 1.6 grams per square meter, with amounts within the range of about 0.15 to 1.3 grams per square meter being preferred. In many instances, because of copper cementation, the phosphate coatings produced are found to have a clear red color. That such coatings are effective in providing a good base for an electrophoretically applied coating is somewhat surprising in that heretofore, when using copper as an accelerator in a phosphate bath, it was the practice to add copper to the coating bath only in such small amounts that no visible copper cementation occurred on the metal surface. The reason for this has been that the corrosion resistance of the coating was found to be decreased as the copper content on the metal surface increased.

Following the application of the copper containing zinc phosphate coating to the metal surface, the coating produced is, desirably, rinsed with water following which it may be rinsed with an aqueous solution containing hexavalent chromium, as is known in the art. The thus-rinsed surface may then be further rinsed, as for example with deionized water, and dried prior to the application of the protective paint or lacquer coating.

The thus-treated surface are then coated by the electrophoretic application of a suitable paint or lacquer. This electrophoretic application of the paint or lacquer may be carried out in various ways, as are known to those in the art. Typically, the coating solutions utilized are dilute aqueous solutions having a solids content within the range of about 3 to 15% solids. The surface to be coated is preferably the anode and the voltages used are typically in the range of about 50 to 100 volts (direct current). Typical current densities used and coating times required are, respectively, from about 0.1 to 7 amperes per square foot and from about 10 seconds to three minutes. Normally, the paint solution used is at substantially room temperature, i.e. about 20° centigrade, although higher temperatures, such as those from 30 to 40 degrees centigrade or even higher, may be used if desired. The coating applied using these techniques are water-thinned resin paints or lacquers which are typically aqueous solutions based on synthetic resins such as alkyd resins, acrylic polymers, melamine resins, epoxy resins, and the like. These aqueous resin solutions generally have a pH of about 9 and the solvent used is either water or an aqueous alcoholic mixture. It is, of course, to be appreciated that these coating solutions may be either as paints or lacquers, i.e., they may be either pigmented, or unpigmented, the pigments used being those which are typical for paints of this type.

In order that those skilled in the art may better understand the present invention and the manner in which it may be practiced, the following specific examples are given. In these examples, unless otherwise indicated, parts and percent are by weight and temperatures are in degrees centigrade. It is to be appreciated, however, that these examples are merely exemplary of the present invention and are not to be taken as a limitation thereof.

Example 1

Cold rolled smooth steel sheets were cleaned by spraying for two minutes at 65 degrees centigrade with an aqueous solution containing two grams per liter of a cleaner having the following compositions:

| | Percent |
|---|---|
| NaOH | 10 |
| $Na_2HPO_4$ | 8 |
| Titanium phosphate activator | 1 |
| Non-ionic wetting agent | 7 |

Thereafter, the steel surfaces were rinsed by spraying for 30 seconds with cold water. The thus-rinsed surfaces were then given a phosphate coating by spraying for two minutes at 50 degrees centigrade with an aqueous solution containing the following components in the amounts indicated:

| | Grams per liter |
|---|---|
| Zinc | 2.92 |
| $P_2O_5$ | 5.5 |
| $NO_3$ | 2.3 |
| Na | 0.4 |
| $NaNO_2$ | 0.17 |

It was found that 10 milliliters of this coating solution required 12 milliliters of 0.1 normal NaOH for neutralization to the phenol phthalene end point. Thereafter, the coated surfaces were rinsed by spraying for 30 seconds with cold water, sprayed for 30 seconds at 40° centigrade with an aqueous solution containing 100 milligrams per liter $CrO_3$ rinsed with deionized water and then dried for 10 minutes in a circulating air oven at 120° centigrade. The phosphate coatings thus-produced on the metal surface was found to have a coating weight of about 3 grams per square meter. To one set of the thus-coated metal sheets, a water-soluble red pigmented epoxy paint, containing 10% solids was electrophoretically applied, the paint application being carried out for 170 seconds at a voltage of 150 volts and a temperature of 23° centigrade. The paint thus-applied was then baked for 25 minutes at 175° centigrade. To a second series of the coated steel surfaces, a water-soluble black pigmented epoxy paint, containing 9% solids was electrophoretically applied. The paint application being carried out for 2 minutes at 125 volts, at a temperature of 30 degrees centigrade. The paint thus-applied was then baked for 30 minutes at 175° centigrade. To a third series of the phosphate coated steel, a conventional epoxy lacquer was applied by dipping the surfaces into the lacquer solution and baking the coated surfaces for 15 minutes at 160 degrees centigrade. The two electrophoretically applied coatings were found to have numerous depressions and pores, while the epoxy film, applied by dipping, was found to be substantially free of pores. The painted sheets were then scratched diagonally with a steel needle so that bare metal was exposed at the scratch. The sheets were then exposed, with the scratched surface inclined upward, to the salt spray test, ASTM B117–54T, wherein the surfaces were continuously sprayed with a 5% aqueous sodium chloride solution at 35° centigrade. It was found that the sheets coated with the electrophoretically applied red pigmented epoxy paint and the electrophoretically applied black pigmented epoxy paint required exposure for 60 and 36 hours, respectively, to cause a removal of paint for a distance of 3 millimeters from each side of the scratch. The sheet dip coated with the epoxy paint, however, required exposure for 288 hours to cause paint removal for 3 millimeters on each side of the scratch.

In the following examples, the procedure of Example 1 was repeated with the exception that various additives were ade to the phosphatizing bath as indicated. In these examples, where copper was added, it was added as $Cu(NO_3)_2 \cdot 3H_2O$, while $SiF_6$ was added as $Na_2SiF_6$ and F was added as NaF. The additives used and the results obtained were as follows:

| Phosphate solution additive and amount | Copper deposited in phosphate layer in grams sq./meter | Hours for removal of 3 millimeters of paint in salt spray test: Electrophoretically applied red pigmented epoxy paint | Electrophoretically applied black pigmented epoxy paint | Dip applied epoxy paint |
|---|---|---|---|---|
| Example: | | | | |
| 2 Cu, 3 milligrams/liter | 0.03 | 60 | 48 | 120 |
| 3 Cu, 10 milligrams/liter | 0.10 | 60 | 48 | 168 |
| 4 Cu, 30 milligrams/liter | 0.30 | 288 | 216 | 216 |
| 5 Cu, 100 milligrams/liter | 0.90 | 216 | 120 | 216 |
| 6 Cu, 30 milligrams/liter and NaCl, 5 grams/liter | 0.40 | 288 | 216 | 216 |
| 7 NaCl, 5 grams/liter | 0 | 72 | <24 | 216 |
| 8 Cu, 30 milligrams/liter, $SiF_6$, 1.08 grams/liter, F, 0.13 grams/liter | 0.30 | 288 | 216 | 216 |

What is claimed is:

1. A method for forming a protective coating on a ferrous metal surface which comprises contacting said surface with an acidic zinc phosphate coating solution containing from about 3 to 200 milligrams per liter of $Cu^{++}$ for a period sufficient to form a zinc phosphate coating containing metallic copper on the surface and, thereafter, electrophoretically depositing a paint on the thus-coated surface.

2. The method as claimed in claim 1 wherein the zinc phosphate coating solution contains from about 15 to 150 milligrams per liter of $Cu^{++}$.

3. The method as claimed in claim 2 wherein the copper containing zinc phosphate coating produced on the metal surface has a coating weight which is not substantially in excess of about 10 grams per square meter.

4. The method as claimed in claim 3 wherein the copper containing zinc phosphate coating produced on the metal surface has a coating weight which is not substantially in excess of about 6 grams per square meter.

5. The method as claimed in claim 3 wherein the copper containing zinc phosphate coating produced on the metal surface contains copper in an amount within the range of about 0.03 to 1.6 grams per square meter.

6. The method as claimed in claim 4 wherein the copper containing zinc phosphate coating produced on the metal surface contains copper in an amount within the range of about 0.15 to 1.3 grams per square meter.

7. The method as claimed in claim 3 wherein the electrophoretic deposition of the paint is carried out using voltages within the range of about 50 to 1000 volts, temperatures from about 20 to 40 degrees centrigrade for a period of time from about 10 seconds to 3 minutes.

8. The method as claimed in claim 4 wherein the electrophoretic deposition of the paint is carried out using voltages within the range of about 50 to 1000 volts, temperatures within the range of about 20 to 40 degrees centrigrade, for a period of time from about 10 seconds to 3 minutes.

References Cited

The following references, cited by the Examiner, are of record in the patent file of this patent or the original patent.

UNITED STATES PATENTS

| | | | |
|---|---|---|---|
| 3,502,511 | 3/1970 | Forsberg | 204—181 |
| 1,949,090 | 2/1934 | Tanner et al. | |
| 2,001,754 | 5/1935 | Thompson et al. | 148—6.15 |
| 2,554,139 | 5/1951 | Drysdale | 148—6.15 |
| 2,813,812 | 11/1957 | Sommers et al. | |
| 2,873,709 | 2/1959 | Celovsky | 148—6.15 |
| 3,109,757 | 11/1963 | Reinhold. | |
| 3,116,178 | 12/1963 | Upham. | |
| 3,230,162 | 1/1966 | Gilchrist | 204—181 |
| 3,333,988 | 8/1967 | Douty et al. | |

FOREIGN PATENTS

| | | |
|---|---|---|
| 517,049 | 1/1940 | Great Britain. |

HOWARD S. WILLIAMS, Primary Examiner